United States Patent [19]
Otaki

[11] Patent Number: 6,034,814
[45] Date of Patent: Mar. 7, 2000

[54] DIFFERENTIAL INTERFERENCE MICROSCOPE

[75] Inventor: Kumiko Otaki, Edogawa-Ku, Japan

[73] Assignee: Nikon Corporation

[21] Appl. No.: 09/243,332

[22] Filed: Feb. 1, 1999

[30] Foreign Application Priority Data

Feb. 2, 1998 [JP] Japan ................................. 10-036665

[51] Int. Cl.$^7$ .......................... G02B 21/14; G02B 27/28; G02B 5/30; G01B 9/02
[52] U.S. Cl. .......................... 359/371; 359/498; 359/500; 359/578; 356/351; 356/353
[58] Field of Search .................... 359/371, 370, 359/494–498, 500, 577, 578; 356/351, 353

[56] References Cited

U.S. PATENT DOCUMENTS 3,868,168  2/1975  De Veer .................................. 356/351
4,964,707  10/1990  Hayashi .................................. 359/371

FOREIGN PATENT DOCUMENTS 1953895  5/1971  Germany ................................ 359/371

Primary Examiner—Jon Henry
Attorney, Agent, or Firm—Downs Rachlin & Martin PLLC

[57] ABSTRACT

A reflected light differential interference microscope (100) having a birefringent optical member (B). Each birefringent optical member has a ray-separating plane ($Q_B$) that intersects the optical axis (A2') at an intersection point ($P_B$) at a first angle ($\beta$) with respect to a reference plane ($P_2$) oriented perpendicular to the optical axis. The microscope further includes an objective lens (113) having a focal point ($F_{113}$) along the optical axis. The birefringent optical member is designed so as to be movable along a line oriented at a second angle ($\gamma$) with respect to the reference plane in a manner that maintains the intersection point and the focal point substantially coincident. This allows for the color of the image (115) to be varied without degrading the image quality.

24 Claims, 7 Drawing Sheets

6,034,814

DIFFERENTIAL INTERFERENCE MICROSCOPE

FIELD OF THE INVENTION

The present invention relates to a differential interference microscope used for observing micro-irregularities of specimens such as metal surfaces, phase objects in living cells, and the like.

BACKGROUND OF THE INVENTION

A differential interference microscope is used to observe microscopic detail in specimens. The image formed in such a microscope represents the gradient of optical paths for both low and high spatial frequencies and may be a monochromatic shadow-cast image or an image with various background colors. With reference to FIG. 1, a conventional (i.e., prior art) reflected light differential interference microscope 10 comprises, along a first optical axis A1, a light source 11, a collector lens 12 and a polarizer P. A beam splitter BS is located adjacent polarizer P at the intersection of optical axis A1 and a second optical axis A2 arranged perpendicular to optical axis A1. Adjacent beam-splitter BS along optical axis A2 is a birefringent optical member in the form of a Wollaston prism W having a ray-separating plane $Q_W$ which intersects optical axis A2 at an intersection point $P_W$. Adjacent prism W is an objective lens 13 having a rear focal point $F_{13}$ and an object plane OP within which is located a specimen (object) 14 to be observed. On the side of beam-splitter BS opposite Wollaston prism W and along axis A2 is an analyzer A and an image plane IP.

Microscope 10 operates as follows. Light (i.e., light beam) $L_1$ from light source 11 is converged by collector lens 12 which directs the light through polarizer P thereby linearly polarizing the light. Polarized light $L_1$ then impinges beam splitter BS, which reflects the light to Wollaston prism W. In prism W, polarized light $L_1$ is separated by birefringent action into two linearly polarized components represented by rays $R_o$ and $R_e$ having mutually orthogonal oscillation directions. After passing through prism W, rays $R_o$ and $R_e$ travel divergently with a small separation angle α as if they were apparently separated at ray-separating plane $Q_W$. Rays $R_o$ and $R_e$ then proceed toward objective lens 13, which also serves as a condenser lens. Diverging rays $R_o$ and $R_e$ are made parallel by the converging action of objective lens 13, with the rays being separated by a small shear amount S. Parallel rays $R_o$ and $R_e$ then illuminate specimen 14 at slightly separated positions.

With continuing reference to FIG. 1, rays $R_o$ and $R_e$ are reflected from specimen 14 at the slightly separated positions and are converged onto ray-separating plane $Q_W$ by the convergent action of objective lens 13. Rays $R_o$ and $R_e$ are then synthesized into one light beam $L_2$ by the birefringent action of prism W. Synthesized light beam $L_2$ then travels in reverse on the identical optical path, and passes through beam splitter BS to analyzer A. Only the components of light beam $L_2$ that oscillate in the identical direction pass through analyzer A. These components then interfere, giving rise to interference fringes (not shown) corresponding to the phase difference imparted to rays $R_o$ and $R_e$ upon reflecting from specimen 14. The interference fringes are observed at image plane IP as a magnified image 15.

With reference now to FIG. 2, prior art Wollaston prism W of microscope 10 (FIG. 1) is constituted by cementing two wedge prisms Wa and Wb, both formed from birefringent optical material. Examples of such material is a crystal like quartz or calcite. Prism wedges Wa and Wb are combined such that their respective optic axes are mutually orthogonal. More particularly, prism W is formed so that optic axis c of wedge prism Wa (i.e., the entrance-side prism) is in the x-axis direction and optic axis d of wedge prism Wb (i.e., the exit-side prism) is in the y-axis direction. The z-axis is the travel direction of a perpendicularly impinging light ray R. The y-axis is the axis orthogonal to the z-axis in the paper plane and the x-axis is the direction orthogonal to and into the paper plane. The wedge angle θ is in the y-z plane, hereinafter called the "wedge plane." Wedge angle θ is defined by normal line $n_M$ of entrance surface M of prism W and the normal line $n_C$ of joining surface C of wedge prisms Wa and Wb.

Referring to FIGS. 1 and 2, light ray R impinges perpendicular to prism W at entrance surface M and is subject to the birefringent action of the birefringent material constituting prism W.

This action separates light ray R into aforementioned two linearly polarized light rays $R_o$ and $R_e$ having mutually orthogonal oscillation directions as indicated by the hash marks on ray $R_e$ and the dots on ray $R_o$. Light rays $R_o$ and $R_e$ exit from prism W at exit surface EXW with separation angle α. However, the point of separation of rays $R_o$ and $R_e$ when viewed from the exit surface EXW side is apparently point $P_W$ in ray-separating plane $Q_W$.

Accordingly, in microscope 10 (FIG. 1), ray-separating plane $Q_W$ may be arranged so that intersection point $P_W$ substantially coincides with rear focal point $F_{13}$ of objective lens 13. This causes light rays $R_o$ and $R_e$ separated upon exiting from prism W, as previously mentioned, to be converted to parallel rays by objective lens 13. This allows the reflected light from specimen 14 to be once again correctly superimposed by prism W. As a result, a differential interference image of high contrast is obtained.

If objective lens 13 is constituted by a plurality of lens groups, the focal point $F_{13}$ may be formed inside a lens group. In particular, in the objective lens of a microscope optical system, the rear focal point is often located inside the lens. In contrast, since apparent ray-separating plane $Q_W$ necessarily exists inside prism W, it is impossible to arrange the prism at focal point $F_{13}$ inside a lens group. Consequently, if focal point $F_{13}$ is to be formed inside a lens group, a Nomarski prism is used in place of Wollaston prism W as the birefringent optical member.

With reference now to FIG. 3, Nomarski prism N is formed so that optic axis e of entrance-side wedge prism Na is in the x-axis direction. In addition, optic axis g of exit-side wedge prism Nb is in the y-z plane in a direction inclined by a predetermined angle ε with respect to exit surface EXN. Such a formation allows for a ray-separating plane $Q_N$ to be formed outside prism N. Accordingly, if focal point $F_{13}$ is formed inside a lens group, it is preferable to use prism N, which can be made to act in the same manner as prism W by arranging ray-separating plane $Q_N$ formed outside of prism N to intersect rear focal point $F_{13}$ of objective lens 13 (see FIG. 1).

In prior art microscope 10 of FIG. 1, it is preferable that image 15 be observed based on various background colors by varying the interference color. To do so, a phase difference is intentionally imparted between rays $R_o$ and $R_e$ to continuously vary the interference color. This imparted phase difference is in addition to the phase difference imparted to rays $R_o$ and $R_e$ upon reflecting from specimen 14.

There are several known methods of continuously varying the background color in the interference image in differential interference microscopes such as microscope 10. A first method involves inserting into the optical path a prism comprising a birefringent material and a so-called compensator plate, or a phase shifting element that combines plane parallel plates to vary the phase difference.

A second method imparts a phase difference by moving the birefringent optical member parallel along the direction of the line of intersection of the plane orthogonal to optical axis A2 and the plane that includes normal line $n_M$ of entrance surface M and the normal line $n_C$ of joining surface C (i.e., the y-direction), and by varying the ratio of the optical path lengths wherein the polarized rays $R_o$ and $R_e$ pass through entrance-side wedge prism Na and the exit side wedge prism Nb, respectively.

The first method is problematic because it requires a complex microscope construction. This results in high manufacturing cost due to the addition of a separate compensator plate or phase shifting element. The second method has the advantage that the background color can be varied without the addition of new parts. Accordingly, this second method is often adopted in differential interference microscopes. However, this method has other problems. For example, the ray-separating plane $Q_W$ of Wollaston prism W or the ray-separating plane of $Q_N$ of Nomarski prism N when used as the birefringent optical member is generally inclined in the wedge-angle θ direction of the prism (namely, in the wedge plane) by an angle $\beta_W$ or $\beta_N$, respectively, as illustrated in FIGS. 2 and 3. Further, inclination angle β differs depending on the construction of the prism. Inclination angle $\beta_W$ of ray separating plane $Q_W$ is comparatively small (and may be $\beta_W$=0), and so may be ignored. However, it is known that inclination angle $\beta_N$ of ray separating plane $Q_N$ is extremely large compared with that of prism W. Consequently, the size of inclination angle $\beta_N$ cannot generally be ignored.

As mentioned above, objective lens 13 generally comprises a plurality of lens groups. Accordingly, it is often the case that its rear focal point $F_{13}$ exists inside a lens. Using the fact that ray-separating plane $Q_N$ is formed outside of prism N, it is often the case that prism N is generally used as the birefringent optical member on the objective lens 13 side. With reference now to FIGS. 4 and 5, prism N is moved parallel along the direction of the line of intersection of the wedge plane and the plane orthogonal to optical axis A2 (i.e., parallel to the y-axis).

FIG. 4 shows the standard state wherein a prism central axis J is arranged on optical axis A2. In this state, intersection point $P_N$ of ray-separating plane $Q_N$ exactly substantially coincides with rear focal point $F_{13}$ of objective lens 13. On the other hand, FIG. 5 shows a state wherein prism N is moved in parallel by an amount Δy along the y-direction for the purpose of varying the interference color in image 15 (FIG. 1). In this state, intersection point $P_N$ and rear focal point $F_{13}$ of objective lens 13 are displaced on optical axis A2 by an amount Δz. Such a displacement between intersection point $P_N$ and rear focal point $F_1$ of objective lens 13 degrades and reduces the contrast of image 15.

SUMMARY OF THE INVENTION

The present invention relates to a differential interference microscope used for observing micro-irregularities of specimens such as metal surfaces, phase objects in living cells, and the like.

The present invention addresses the above-described problems associated with obtaining a satisfactory differential interference image with low image degradation and high contrast, regardless of the movement of the birefringent optical member for changing the background color of the image.

Accordingly, a first aspect of the invention is a differential interference microscope capable of forming an interference image of a light-transmissive object. The microscope comprises, along an optical path defined by an optical axis, a source of polarized light, and a first birefringent optical member having a ray-separating plane which intersects the optical axis at an intersection point. The ray separating plane is oriented at a first angle β with respect to a first plane perpendicular to the optical axis. The first birefringent optical member is designed so as to separate the light into two light rays having mutually orthogonal polarization components. The first birefringent optical member is also designed so as to be movable at a second angle γ with respect to the first plane in a manner that maintains the intersection point at a fixed position on the optical axis. Adjacent the first birefringent optical member is a first lens having a focal point substantially coincident with the intersection point. This allows the two light rays to become substantially parallel with a predetermined amount of shear therebetween and to be incident the object such that the object imparts a phase difference between the two light rays. Adjacent the object is a second lens designed so as to converge the light rays. Adjacent the second lens is a second birefringent optical member designed so as to synthesize the two light rays into a single light beam. An analyzer is arranged adjacent the second birefringent optical member and is designed so as to pass a single polarization component of the single light beam to create the interference image.

A second aspect of the invention is a differential interference microscope capable of forming an interference image of a light-reflective object. The microscope comprises, along an optical path defined by first and second optical axes, a source of polarized light disposed along the first optical axis, and a beam-splitter disposed at the intersection of the first and second optical axes. Adjacent the beam-splitter and disposed along the second optical axis is a birefringent optical member having a ray-separating plane which intersects the second optical axis at an intersection point. The ray-separating plane is oriented at a first angle β with respect to a first plane perpendicular to the optical axis. The birefringent optical member is designed so as to separate the light into two light rays having mutually orthogonal polarization components. The birefringent optical member is also designed so as to be movable at a second angle γ with respect to the first plane in a manner that maintains the intersection point at a fixed position on the second optical axis. Adjacent the birefringent optical member and also disposed along the second optical axis is a lens having a focal point substantially coincident with the intersection point so as to make the two light rays substantially parallel with a predetermined amount of shear therebetween. The lens is also designed to direct the two light rays to the object such that the object imparts a phase difference between the two light rays, and to direct the two light rays back through the birefringent optical member to form a single light beam. Disposed downstream from the birefringent optical member is an analyzer designed so as to pass a single polarization component of the single light beam to create the interference image.

A third aspect of the invention is a method of forming an interference image of an object in a differential microscope. The method comprises the steps of first passing polarized light through a movable birefringent optical member having a ray-separating plane intersecting the optical axis at an intersection point, thereby creating two mutually orthogonal linearly polarized light rays having a divergence angle. The next step is imparting a first phase difference between the two rays by moving the movable birefringent optical member in a movement direction such that the intersection point remains at a fixed position on the optical axis. The next step is passing the two light beams through a lens having a focal point arranged to substantially coincide with the intersection point, thereby making the two light rays substantially parallel and guiding the two light rays to the object such that the object imparts a second phase difference between the light rays. The next step is synthesizing the two light rays into a single light beam. The next step is passing the single light beam through an analyzer thereby forming a polarized interference light beam. The final step is forming the interference image from the polarized interference light beam.

DETAILED DESCRIPTION OF THE INVENTION

The present invention relates to a differential interference microscope used for observing micro-irregularities of specimens such as metal surfaces, phase objects in living cells, and the like.

Figure 1:
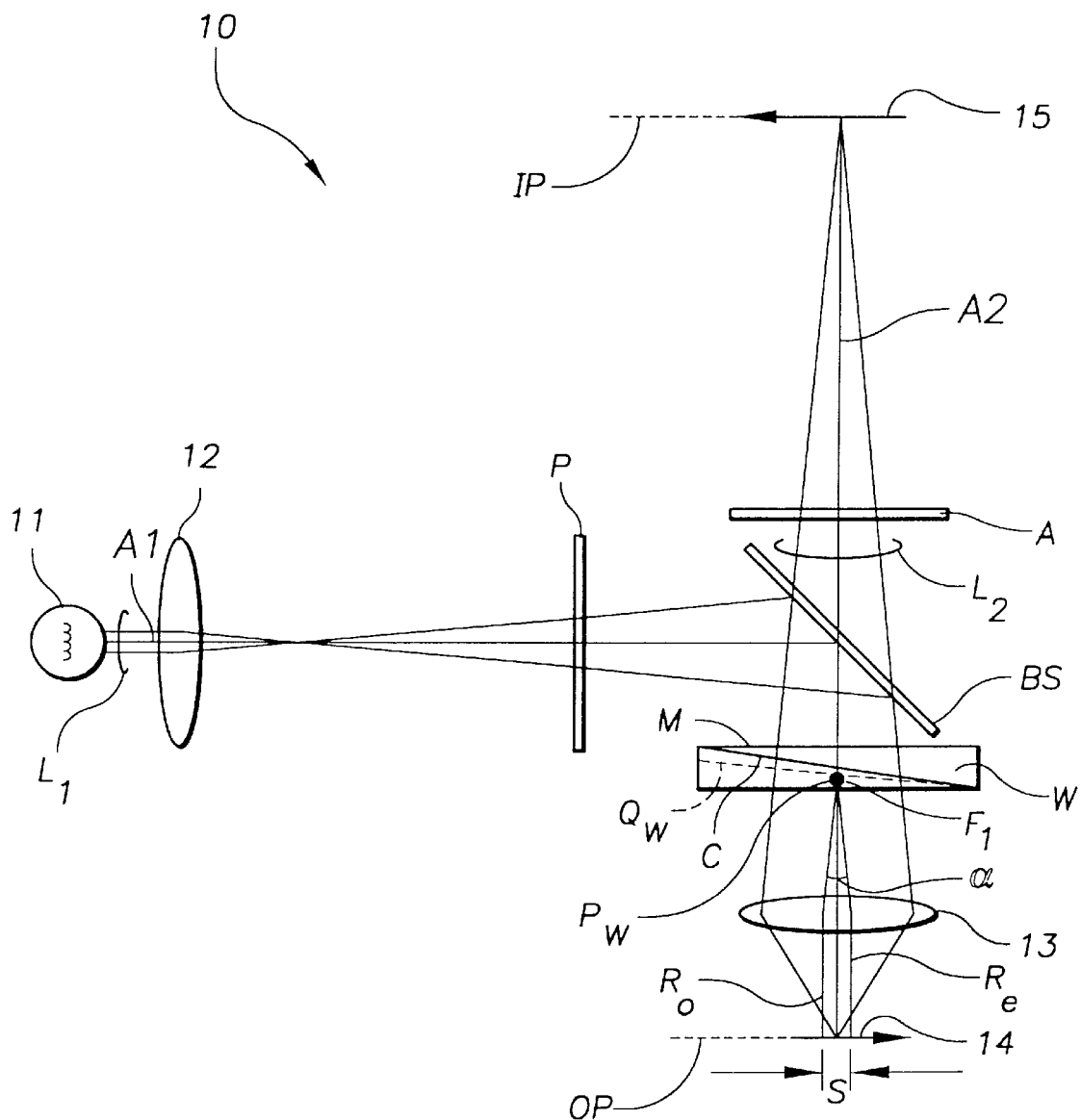
FIG. 1. is a simplified cross-sectional schematic diagram of a conventional prior art reflected light differential interference microscope.
Figure 2:
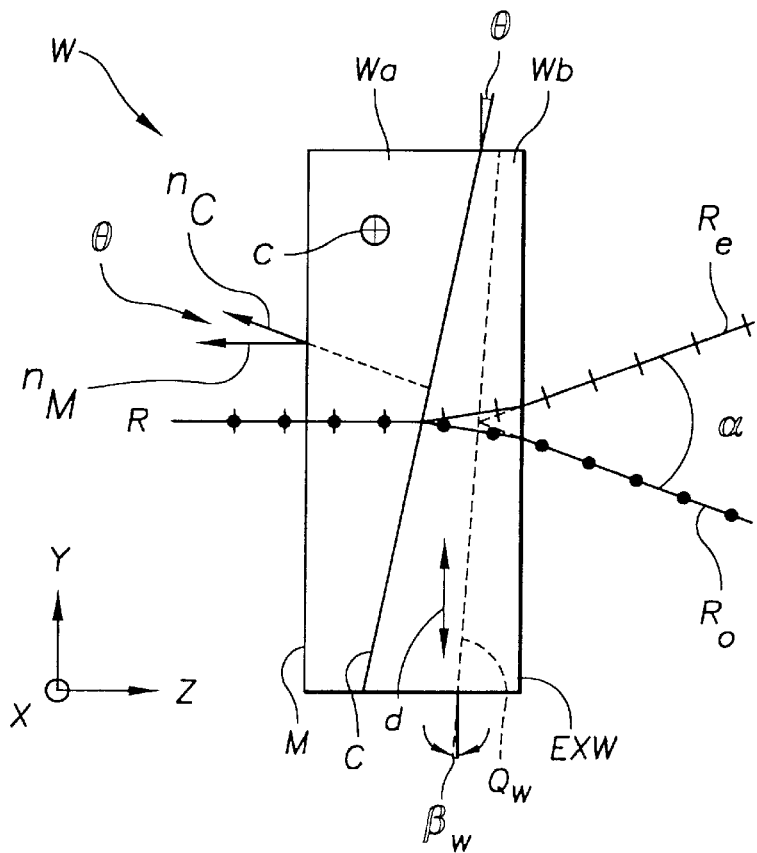
FIG. 2 is a cross-sectional diagram of a prior art Wollaston prism.
Figure 3:
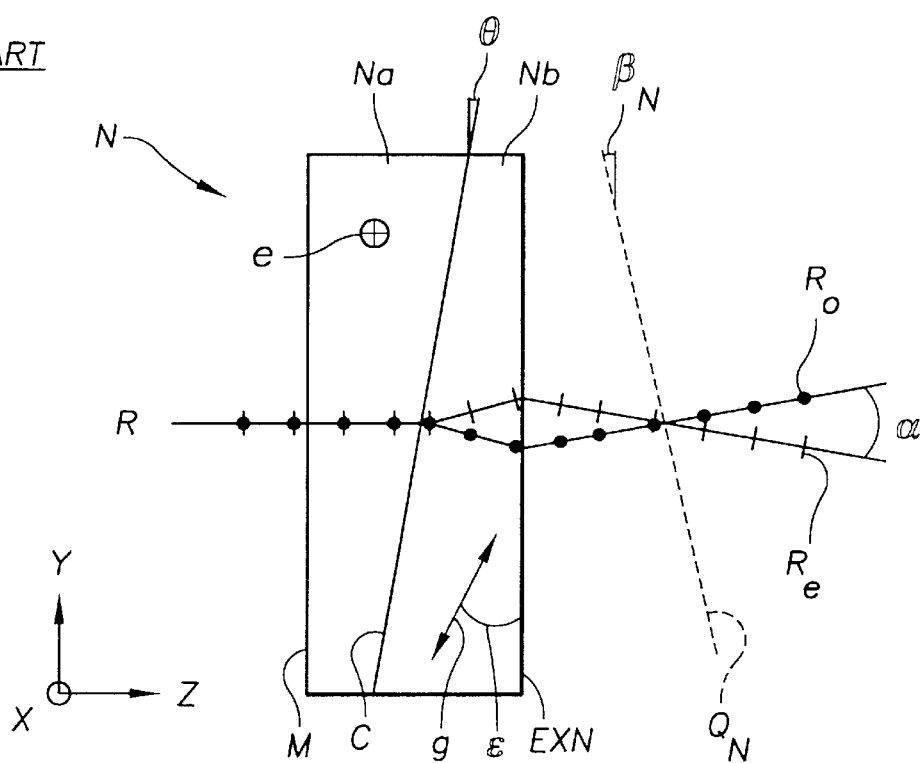
FIG. 3 is a cross-sectional diagram of a prior art Nomarski prism.
Figure 4:
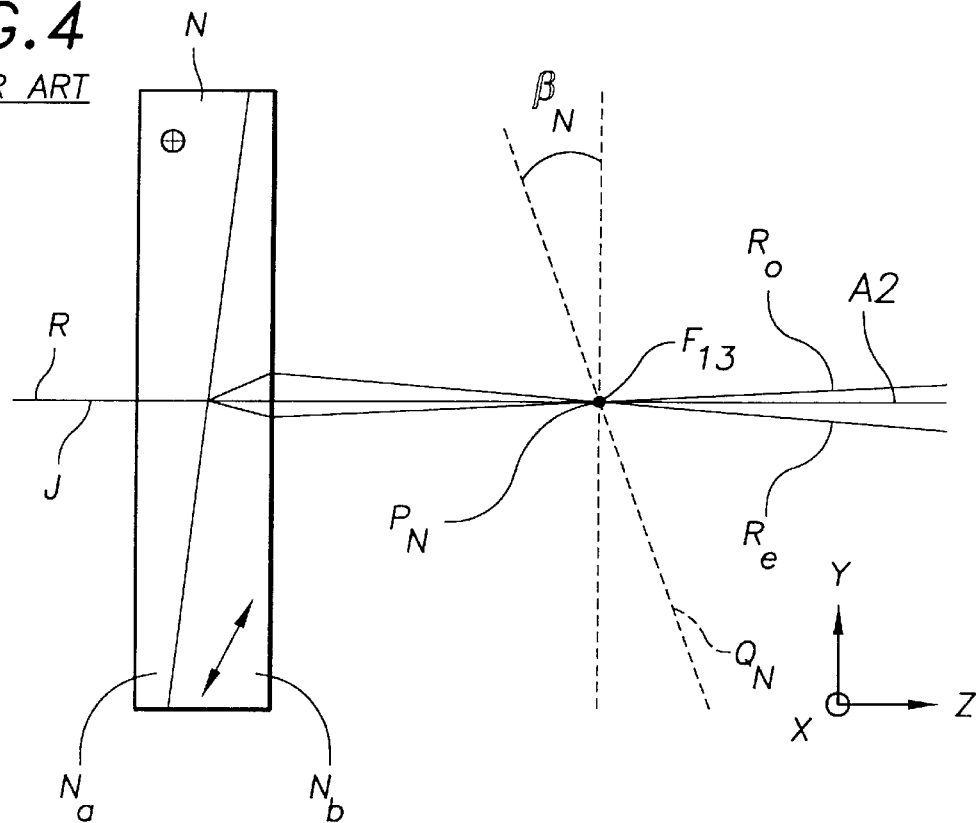
FIG. 4 is a cross-sectional schematic diagram illustrating the positional relationship of the ray-separating plane of the prior art Nomarski prism of FIG. 3 and the objective lens of the microscope of FIG. 1.
Figure 5:
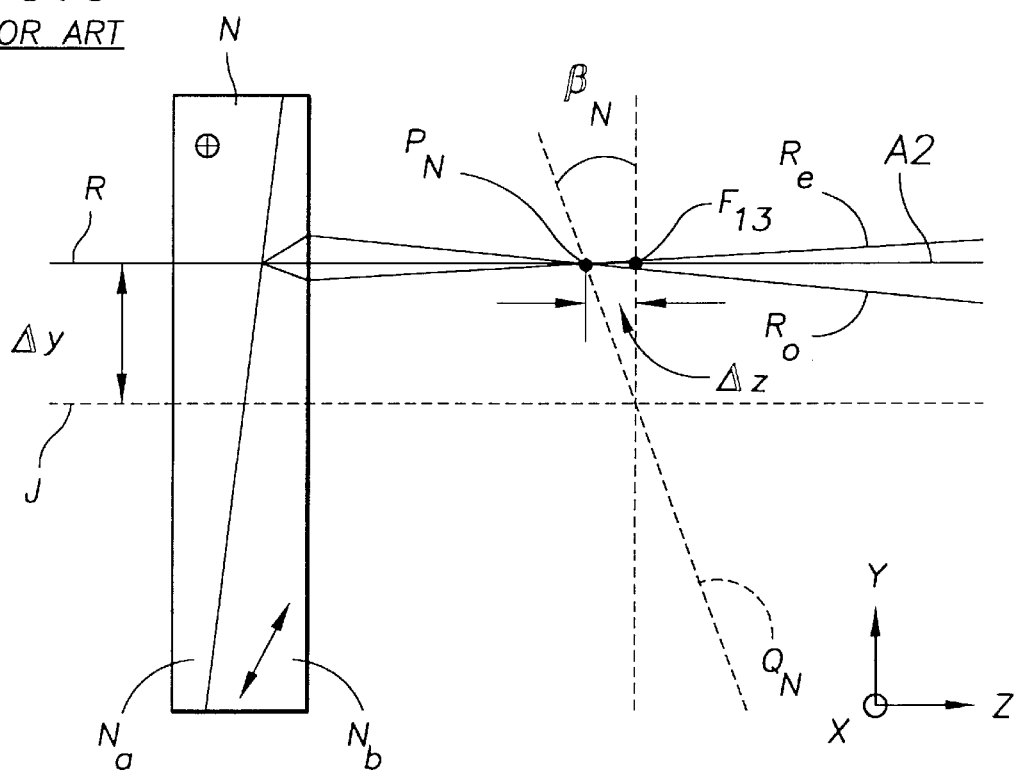
FIG. 5 is the same cross-sectional schematic diagram of FIG. 4, but with the Nomarski prism shifted in the y-direction to effect a color change in the interference image formed by the microscope of FIG. 1.
Figure 6:
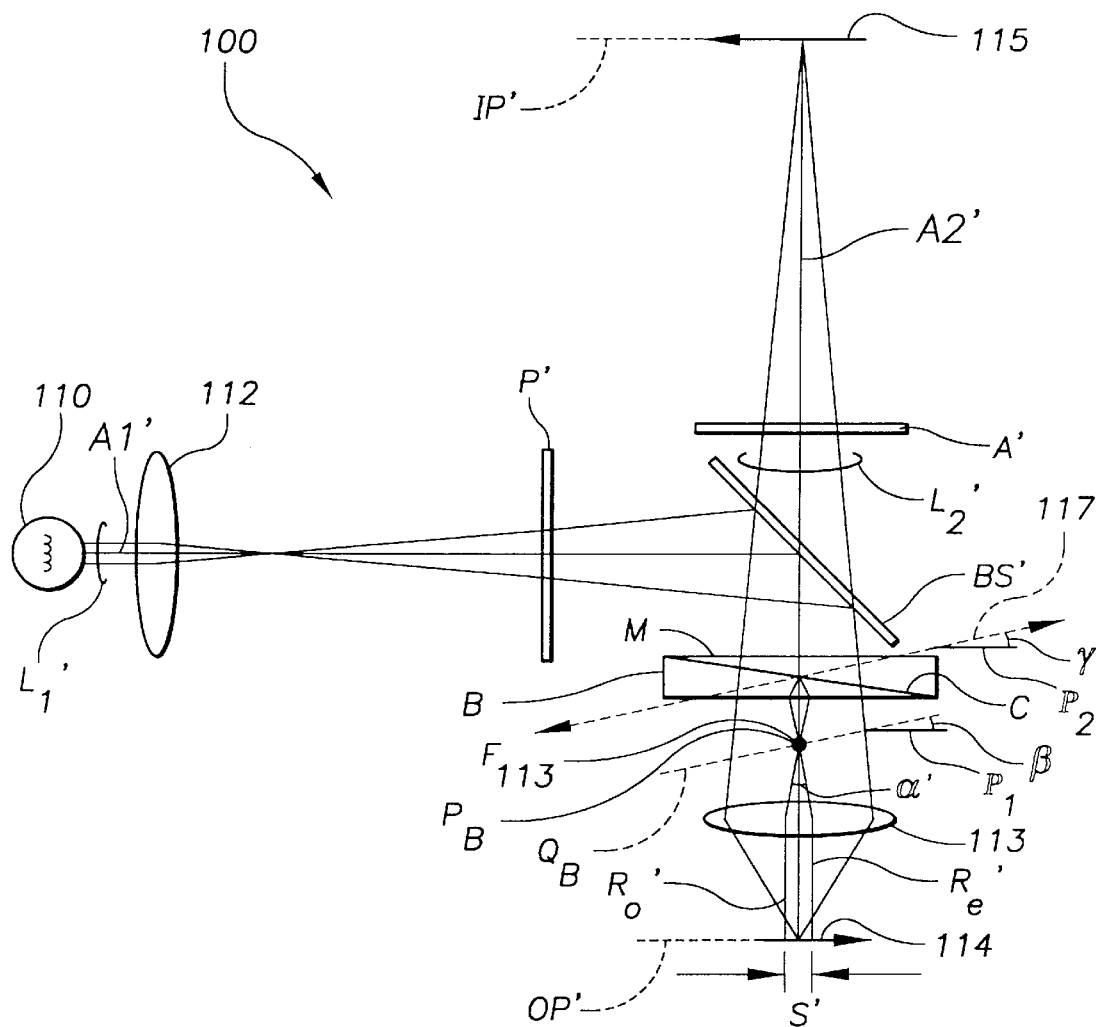
FIG. 6. is a simplified cross-sectional schematic diagram of the reflected light differential interference microscope according to a first embodiment of the present invention.

With reference to FIG. 6, microscope 100 of the present invention comprises, along optical axis A1', a light source 110, a collector lens 112 and a polarizer P'. A beam splitter BS' is located adjacent polarizer P' at the intersection of optical axis A1 and a second optical axis A2' arranged perpendicular to optical axis A1'. Adjacent beam-splitter BS' along optical axis A2' is a Nomarski-type prism B having a ray-separating plane $Q_B$ which intersects optical axis A2' at an intersection point $P_B$. Adjacent prism B is an objective lens 113 having a rear focal point $F_{113}$ and an object plane OP' within which is located a specimen (object) 114 to be observed. On the side of beam-splitter opposite prism B and along axis A2' is an analyzer A' and an image plane IP'.

Microscope 100 operates as follows. Light (i.e., light beam) $L'_1$ from light source 110 is converged by collector lens 112 which directs the light through polarizer P' thereby linearly polarizing the light. The polarized light $L'_1$ then impinges beam splitter BS', which reflects the light to prism B.

Polarized light $L'_1$ enters prism B and is separated by birefringent action into two linearly polarized components represented by rays $R_o'$ and $R_e'$ having mutually orthogonal oscillation directions. After passing through prism B, rays $R_o$ and $R_e$ ultimately travel divergently with a small separation angle $\alpha'$ as if they were apparently separated at ray-separating plane $Q_B$. Rays $R_o'$ and $R_e'$ then proceed toward objective lens 113, which also serves the role of a condenser lens. Objective lens 113 is arranged such that rear focal point $F_{113}$ substantially coincides with ray-separating plane $Q_B$. This arrangement causes diverging rays $R_o'$ and $R_e'$ to become parallel by the converging action of objective lens 113, with the rays being separated by a small shear amount S'. Parallel rays $R_o'$ and $R_e'$ then illuminate specimen 114 at slightly separated positions.

With continuing reference to FIG. 6, rays $R_o'$ and $R_e'$ are reflected from specimen 114 at the slightly separated positions and are converged onto ray-separating plane $Q_B$ by the convergent action of objective lens 113. Rays $R_o'$ and $R_e'$ are then synthesized into one light beam $L'_2$ by the birefringent action of prism B. Synthesized light beam $L'_2$ then travels in reverse along optical axis A2' on the identical optical path, and passes through beam splitter BS' to analyzer A'. Only the components of light beam $L'_2$ that oscillate in the identical direction pass through analyzer A'. These components then interfere, giving rise to interference fringes (not shown) corresponding to the phase difference imparted to rays $R_o'$ and $R_e'$ upon reflecting from specimen 114. The interference fringes are observed at image plane IP' as a magnified image 115.

With continuing reference to FIG. 6, to vary the background color of image 115, prism B is designed so as to be movable along a line 117, i.e., in a direction parallel to the line of intersection of the wedge plane of prism B and ray-separating plane $Q_B$, which forms an angle $\beta$ with a reference plane $P_1$ perpendicular to optical axis A2'. Namely, the movement direction of prism B is along line 117, which forms an angle $\gamma$ with a reference plane $P_2$ perpendicular to optical axis A2', with $\gamma=\beta$. In this case, the position of intersection point $P_B$ on optical axis A2' does not vary when prism B is moved along line 117 with $\gamma=\beta$ (i.e., parallel to the line of intersection of the wedge plane and ray separating plane $Q_B$). Thus, it is possible to vary the background color of image 115 while maintaining a satisfactory differential interference image with low degradation and high contrast. This is because intersection point $P_B$ and rear focal point $F_{113}$ can always be made to coincide on optical axis A2'.

Figure 7:
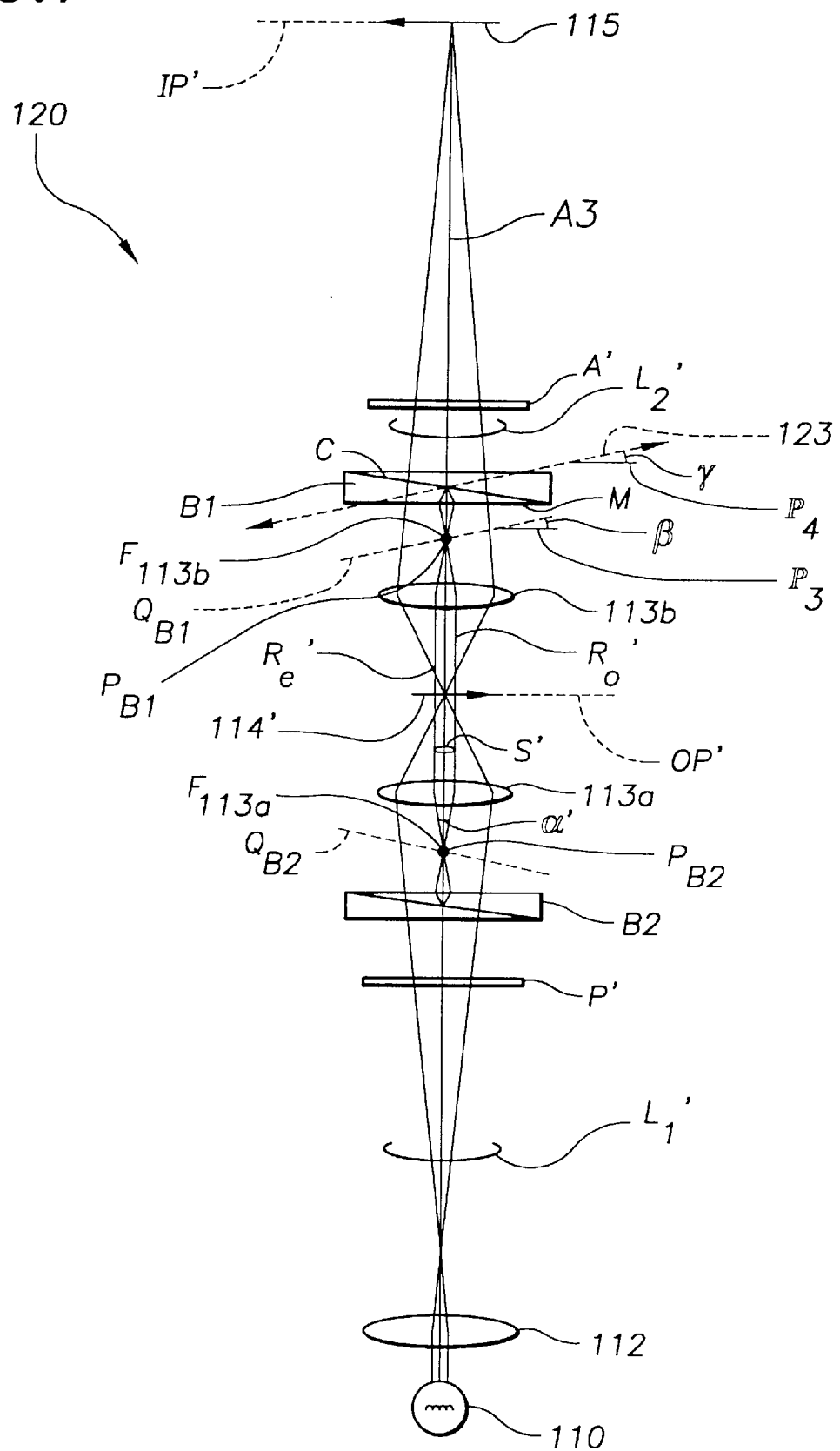
FIG. 7 is a simplified cross-sectional schematic diagram of the transmitted light differential interference microscope according to a second embodiment of the present invention.

With reference now to FIG. 7, microscope 120 is the transmission version of reflection microscope 100 of FIG. 6. Accordingly, microscopes 100 and 120 share many of the same components. Microscope 120 includes two Nomarski-type prisms B1 and B2 having ray-separating planes $Q_{B1}$ and $QB_2$, respectively, with intersection points $P_{B1}$ and $P_{B2}$, respectively, and two lenses 113a and 113b with respective focal points $F_{113a}$ and $F_{113b}$. Specimen 114' is transmissive and is located between lenses 113a and 113b. Lens 113a serves as a condenser lens for illuminating specimen 114, while lens 113a serves as an objective lens. Further, the elements comprising microscope 120 are all arranged along a single optical axis A3.

Accordingly, light (i.e., light beam) $L_1'$ from light source 110 is converged by collector lens 112 and is directed through polarizer P' which linearly polarizes the light. Linearly polarized light $L'_1$ then enters prism B2, which separates the light into two linearly polarized components represented by light rays $R_o'$ and $R_e'$ having mutually orthogonal oscillation directions. Upon exiting prism B2, rays $R_o'$ and $R_e'$ ultimately diverge at a separation angle $\alpha'$ and proceed toward lens 113a. Prism B2, however, is arranged such that intersection point $P_{B2}$ substantially coincides with front focal point $F_{113a}$ of lens 113a on axis A3. Thus, rays $R_o'$ and $R_e'$ become parallel rays mutually separated by a small shear amount S' upon passing through lens 113a. Rays $R_o'$ and $R_e'$ then illuminate specimen 114' at slightly displaced positions.

With continuing reference to FIG. 7, light rays $R_o'$ and $R_e'$ pass through specimen 114' at slightly displaced positions and are converged by the convergent action of lens 113b. Prism B1 is arranged such that intersection point $P_{B1}$ substantially coincides with rear focal point $F_{113b}$ of lens 113b. Rays $R_o'$ and $R_e'$ are then synthesized by the birefringent action of prism B1 into one light beam $L'_2$ which travels along optical axis A3. Synthesized light beam $L'_2$ then passes to analyzer A'. Only the components of light beam $L'_2$ that oscillate in the identical direction pass through analyzer A'. These components then interfere, giving rise to interference fringes (not shown) corresponding to the phase difference imparted to rays $R_o'$ and $R_e'$ upon passing through specimen 114'. The interference fringes are observed at image plane IP' as a magnified image 115.

To vary the background color of image 115 in microscope 120, prism B1 is designed so as to be movable along a line 123, i.e., in a direction parallel to the line formed by the intersection of the wedge plane of prism B1 and ray separating plane $Q_{B1}$ which forms an angle $\beta$ with a reference plane $P_3$ perpendicular to optical axis A3. Namely, the movement direction of prism B1 is along line 123, which forms an angle $\gamma$ with a reference plane $P_4$ perpendicular to optical axis A3, with $\gamma=\beta$. As in the case of microscope 10 of FIG. 6, the position of intersection point $P_{B1}$ on optical axis A3 does not vary when prism B1 is moved along line 123. Accordingly, it is possible to vary the background color of the observation image while maintaining a satisfactory differential interference image with low degradation and high contrast. This is because intersection point $P_{B1}$ and rear focal point $F_{113b}$ of lens 113b can always be made to substantially coincide on optical axis A3.

With continuing reference to FIG. 7, prism B2 may also be designed so as to be movable in a direction parallel to the line of intersection of the wedge plane of prism B2 and ray-separating plane $Q_{B2}$. With this arrangement of microscope 120, the position of intersection point $P_{B2}$ on optical axis A3 does not vary. Thus, intersection point $PB_2$ and rear focal point $F_{113a}$ of lens 113a can always be made to substantially coincide on optical axis A3. Prisms B1 and B2 can also be designed so as to both be movable in parallel.

In practice, the image in a differential interference microscope is generally observed while exchanging a plurality of objective lenses having differing magnifications. It is also often the case with a transmitted light differential interference microscope (e.g., microscope 120 of FIG. 7) that several types of condenser lenses (e.g., lens 113a of FIG. 7) are exchanged and used in accordance with the application and the numerical aperture of the objective lens. Now, the focal position of these objective lenses and condenser lenses generally differ from lens to lens. Thus, it is necessary to prepare different birefringent optical members (e.g., prisms B, B1, B2, etc.) for each lens used to make the focal point of the lens substantially coincide with the intersection point of the birefringent optical member. Since the inclination angle of the ray-separating plane of each birefringent optical member differs, it is necessary to change the movement direction of each different birefringent optical member used. Consequently, a mechanism is needed in the apparatus body of the microscope that is capable of varying the movement direction to suit each birefringent optical member.

Figure 8:
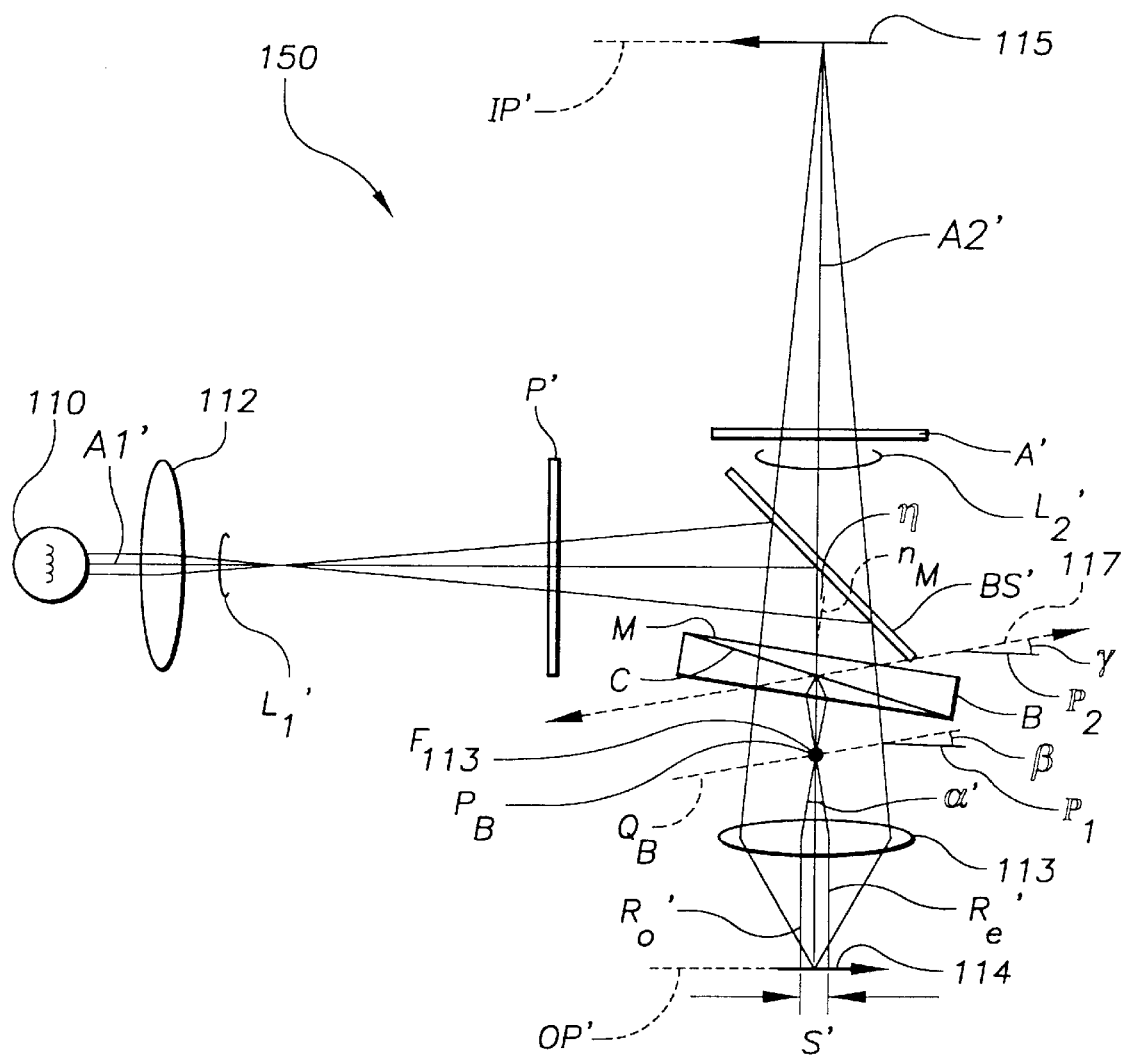
FIG. 8. is a simplified cross-sectional schematic diagram of the reflected light differential interference microscope according to a third embodiment of the present invention.

Accordingly, with reference now to FIG. 8, microscope 150 represents an alternate embodiment of the present invention based on microscope 100 of FIG. 6, but with prism B inclined at an inclination angle $\eta$, i.e., the angle between normal line $n_M$ of surface M of prism B and axis A2'. Angle $\eta$ is formed by rotating prism B about a rotational axis (not shown) of the prism that intersects the wedge plane. In microscope 150, even in the case wherein a different birefringent optical member B is used when exchanging the objective lens 113 or condenser lens 112, the movement direction of the birefringent optical member is always set to a fixed direction (angle $\gamma$) and is inclined by angle $\eta$ to make it correspond to the movement direction of that birefringent optical member. Consequently, a mechanism that varies the movement direction for each birefringent optical member is unnecessary.

In particular, in microscope 150, prism B is arranged inclined by inclination angle $\eta$ so that the movement of prism B along line 117 is fixed and inclination angle $\beta$ of ray-separating plane $Q_B$ substantially coincides with the movement of prism B. Also, inclination angle $\eta$ is set to a predetermined unique value for each unique prism B to be used, so that $\beta=\gamma$. Furthermore, prism B is moved along line 117 while maintaining inclination angle $\eta$, and the background color in image 115 is continuously varied.

With continuing reference to FIG. 8, a prism holder (not shown) may be employed for holding one or more prisms such as prism B in the optical path and sliding one of the prisms in a fixed movement direction along line 117 at angle $\gamma$. Each prism is adjusted to a particular inclination angle $\eta$ so that $\beta=\gamma$. The prism holder is then slid along line 117 at angle $\gamma$, allowing for one prism in the plurality of different prisms to be arranged in the optical path and moved parallel to inclination angle $\beta$ of ray-separating plane $Q_B$.

Figure 9:
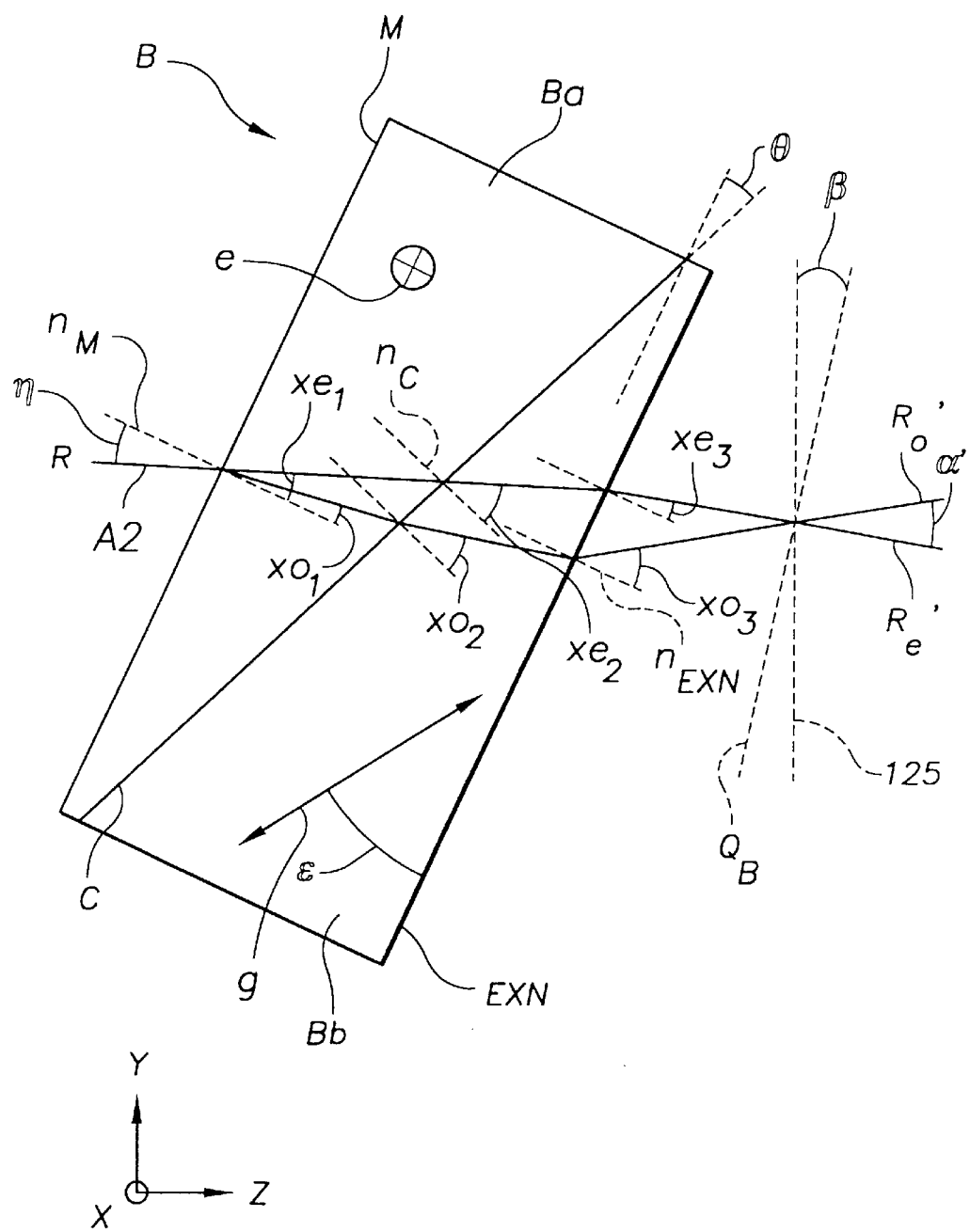
FIG. 9 is a cross-sectional diagram of a Nomarski-type prism of the present invention showing the various ray paths and associated geometry.

With reference now to FIG. 9, setting inclination angle $\eta$ of prism B in microscope 150 is now described. In prism B, which is a Nomarski-type prism, $\eta$ is the inclination angle of normal line $n_M$ of entrance surface M with respect to optical axis A2' in the wedge plane (i.e., paper plane) of prism B, as discussed above. The angle $\theta$ is the wedge angle of prism B, and $\epsilon$ is the inclination angle formed between optical axis g of wedge prism Bb (i.e., the exit-side prism) and exit surface EXN. Angles $\eta$, $\theta$ and $\epsilon$ are variables that determine inclination angle $\beta$ of ray-separating plane $Q_B$ with respect to plane $P_1$ (see FIG. 6). The following explains the conditions that variables $\eta$, $\theta$ and $\epsilon$ must satisfy.

With continuing reference to FIG. 9, incident ray R traveling along optical axis A2' is separated into the two polarized components indicated by light rays $R_o'$ and $R_e'$. Light ray $R_e'$ oscillates in the plane parallel to the wedge plane in prism B (i.e., the y-z plane). Light ray $R_o'$ oscillates in the plane perpendicular to the wedge plane (i.e.. the x-z plane). The angles formed by light rays $R_o'$ and $R_e'$ with respect to the normal line $n_M$ of entrance surface M, normal line $n_C$ of joining surface C and normal line $n_{EXN}$ exit surface EXN of prism B are respectively xe1, xe2 and xe3 for ray $R_e'$, and xo1, xo2 and xo3 for ray $R_o'$. Furthermore, angles xe1, xo1, xo2 and xo3 are a function of $\eta$ and $\theta$, and angles xe2 and xe3 are a function of $\eta$, $\theta$ and $\epsilon$. Upon determining η, θ and ε, each refraction angle of ray $R_o'$ and ray $R_e'$ can be uniformly derived by tracing all polarized light rays.

Separation angle α' between rays $R_o'$ and $R_e'$ is expressed by equation (1), below, wherein S' is the shear amount of differential interference on the surface of specimen 114', and f is the focal length of objective lens 113:

$$\alpha' = xo3(\eta,\theta) - xe3(\eta, \theta, \epsilon) = \tan^{-1}(S'/f) \quad (1)$$

In addition, equation (2), below, holds approximately for inclination angle β of ray-separating plane $Q_B$:

$$\tan \beta \approx \tan \eta - (\tan \theta / \tan \alpha')\{\tan xe1 - \tan xo1 - (\tan xe2 - \tan xo2)\}. \quad (2)$$

To derive the condition that makes inclination angle β of ray-separating plane $Q_B$ equal to movement direction γ of prism B, β=γ should be as given in equation (2). Furthermore, an appropriate θ, η and ε should be determined so that equation (1) and equation (2) are satisfied, and so that intersection point $P_B$ substantially coincides on optical axis A2' with focal point $F_{113}$ of the particular objective lens 113 used (see FIG. 8).

It may prove preferable to adopt an arrangement wherein β=γ=η in equation (2). In this case, the movement mechanism of prism B can be simply constituted by just moving prism B as is along inclination angle η, since the interference color can be varied while always making intersection point $P_B$ substantially coincide on optical axis A2' with the focal point $F_{113}$ of the particular objective lens 113 used.

The preferred embodiment described immediately above applies the present invention to prism B as used in a reflected light differential interference microscope, such as microscope 150 of FIG. 8. However, it will be understood by one skilled in the art that the embodiment described in connection with microscope 150 can likewise be applied to imaging-side prism B1 and illumination-side prism B2 used in a transmitted light differential interference microscope, such as microscope 120 of FIG. 7.

In addition, the present invention has been described using Nomarski-type prisms. However, it will be apparent to one skilled in the art that the method of combining crystals to form a birefringent optical member is not limited to the Nomarski arrangements. In a Nomarski prism, such as prism B in FIG. 9, optical axis e of entrance-side wedge prism Na is formed in the x-axis direction, and optical axis g of exit-side wedge prism Nb is formed inclined at predetermined angle γ with respect to the y-axis in the y-z plane. However, a form of Nomarski prism may be used wherein optical axis e of entrance side wedge prism Na is formed inclined at predetermined angle γ with respect to the y-axis in the y-z plane, and optical axis g of exit side wedge prism Nb is formed in the x-axis direction. In addition, prisms that combine three or more wedge prisms may be used. In addition, it may be preferred to design prism B of apparatus 100 (FIG. 6) or at least one of prisms B1 and B2 in apparatus 120 (FIG. 7) to have an entrance surface (e.g., surface M of prism B in apparatus 100) that is parallel to the ray-separating plane (e.g., $Q_B$ for prism B or $Q_{B1}$ and $Q_{B2}$ for prisms B1 and B2, respectively).

An advantage of the present invention is that it is non-complex and cost-efficient. This is achieved by arranging the birefringent optical member to be inclined with respect to the optical axis so that the inclination angle of the ray-separating plane is always fixed for each birefringent optical member used corresponding to the objective lens and condenser lens. Thus, the birefringent optical member can always be moved in a fixed direction even if the birefringent optical member is exchanged.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A differential interference microscope capable of forming an interference image of an object, comprising along an optical path defined by an optical axis:

a) a source of polarized light;

b) a first birefringent optical member, adjacent said source of polarized light, having a first ray-separating plane which intersects the optical axis at a first intersection point and which is oriented at a first angle β with respect to a first plane oriented perpendicular to the optical axis, said first birefringement optical member designed so as to separate said light into two light rays having mutually orthogonal polarization components and designed so as to be movable at an second angle γ with respect to said first plane in a manner that maintains said first intersection point at a fixed position on the optical axis; and c) a first lens, adjacent said birefringent optical member, having a focal point substantially coincident with said intersection point so as to make said two light rays substantially parallel with a predetermined amount of shear therebetween and to direct said two light rays to the object such that the object imparts a phase difference between said two light rays.

2. A differential interference microscope capable of forming an interference image of an object, comprising along an optical path defined by an optical axis:

a) a source of polarized light;

b) a first birefringent optical member, adjacent said source of polarized light, having a first ray-separating plane which intersects the optical axis at a first intersection point and which is oriented at a first angle β with respect to a first plane oriented perpendicular to the optical axis, said first birefringement optical member designed so as to separate said light into two light rays having mutually orthogonal polarization components;

c) a first lens, adjacent said birefringent optical member, having a focal point substantially coincident with said intersection point so as to make said two light rays substantially parallel with a predetermined amount of shear therebetween and to direct said two light rays to the object such that the object imparts a phase difference between said two light rays;

d) a second lens, adjacent the object, designed so as to converge said light rays;

e) a second birefringent optical member having a second ray-separating plane which intersects the optical axis at a second intersection point, said second birefringement optical member designed so as to synthesize said two light rays into a single light beam;

f) an analyzer, adjacent said second birefringent optical member, designed so as to pass a single polarization component of said single light beam to create the interference image; and g) wherein at least one of said first birefringent optical element and said second birefringent optical element is designed so as to be movable at first and second angles, respectively, relative to said first plane, in a manner that maintains said first and second intersection points at respective fixed positions on the optical axis.

3. A microscope according to claim 1, wherein the object is light-reflective, further comprising:
   a) an analyzer adjacent said birefringent optical member and opposite the object, designed so as to pass a single polarization component of said single light beam to create the interference image.

4. A microscope according to claim 1, wherein said source of polarized light comprises a light source and a polarizer.

5. A microscope according to claim 1, wherein said first birefringent optical member comprises at least two wedge prisms.

6. A microscope according to claim 2 wherein at least one of said first and second birefringent optical member comprises at least two wedge prisms.

7. A microscope according to claim 5, wherein said first birefringent optical member is a Nomarski-type prism.

8. A microscope according to claim 6, wherein at least one of said first and second birefringent optical members is a Nomarski-type prism.

9. A microscope according to claim 1, wherein said first angle $\beta$ equals said second angle $\gamma$.

10. A microscope according to claim 1, wherein said first birefringent optical member has an entrance surface with a normal line oriented at an inclination angle $\eta$ with respect to the optical axis, and wherein said first angle $\beta$ equals said inclination angle $\eta$.

11. A microscope according to claim 2, wherein at least one of said first and second birefringent optical members has an entrance surface with a normal line oriented at an inclination angle $\eta$ with respect to the optical axis, and wherein said first angle $\beta$ equals said inclination angle $\eta$.

12. A differential interference microscope according to claim 1, wherein said first birefringent optical member has an entrance surface parallel to said ray-separating plane.

13. A differential interference microscope according to claim 2, wherein said at least one of said first and second birefringent optical members has an entrance surface parallel to said ray-separating plane.

14. A differential interference microscope capable of forming an interference image of an object, comprising in order along an optical path defined by an optical axis:
   a) a source of polarized light;
   b) a plurality of first birefringent optical members each with an entrance surface having a first normal line forming a unique inclination angle with the optical axis, and each with a first ray-separating plane which intersects the optical axis at a first intersection point and which is oriented at a first angle $\beta$ with respect to a first plane perpendicular to the optical axis, each of said first birefringent optical members designed so as to separate said light into two light rays having mutually orthogonal polarization components; and
   c) a holder designed to hold each first birefringent optical member of said plurality of first birefringent optical members at said unique inclination angle, said holder designed to be movable at a second angle $\gamma$ relative to said first plane, and capable of arranging one first birefringent optical member of said plurality of first birefringent optical members in the optical path, said unique inclination angle being such that when said holder is moved at said second angle $\gamma$, said intersection point of said one first birefringent optical member remains at a fixed position on the optical axis.

15. A microscope according to claim 14, wherein the object is light-transmissive, further comprising:
   a) a first lens, adjacent said one first birefringement optical member, said lens having a focal point substantially coincident with said intersection point so as to make said two light rays substantially parallel with a predetermined amount of shear therebetween and to direct said two light rays to the object such that the object imparts a phase difference between said two light rays;
   b) a second lens, adjacent the object, arranged so as to converge said light rays;
   c) a second birefringent optical member designed so as to synthesize said two light rays into a single light beam at a second intersection point on the optical axis; and
   d) an analyzer, adjacent said second birefringent optical member, designed so as to pass a single polarization component of said single light beam to create the interference image.

16. A microscope according to claim 15, wherein second birefringent optical member is movable at a second angle relative to the optical axis in a manner that maintains said second intersection point at a fixed position on the optical axis.

17. A microscope according to claim 14, wherein the object is light-reflective, further comprising:
   a) a lens, adjacent said one birefringent optical member, said lens having a focal point substantially coincident with said intersection point so as to make said two light rays substantially parallel with a predetermined amount of shear therebetween and to direct said two light rays to the object such that the object imparts a phase difference between said two light rays and passes said two light rays back through said one birefringent optical element form a single light beam from said two light rays; and
   b) an analyzer, disposed adjacent said plurality of birefringent optical members and opposite the object, designed so as to pass a single polarization component of said single light beam to create the interference image.

18. A method of forming an interference image of an object in a differential microscope having an optical axis, comprising the steps of:
   a) passing polarized light through a movable birefringent optical member having a ray-separating plane intersecting the optical axis at an intersection point, thereby creating two diverging mutually orthogonal linearly polarized light rays;
   b) imparting a first phase difference between said two rays by moving said movable birefringent optical member in a movement direction such that said intersection point remains at a substantially fixed position on the optical axis;
   c) passing said two light rays through a lens having a focal point arranged to substantially coincide with said intersection point, thereby making said two light rays parallel and guiding said two light rays to the object such that the object imparts a second phase difference between said light rays;
   d) synthesizing said two light rays into a single light beam;
   e) passing said single light beam through an analyzer thereby forming a polarized interference light beam; and f) forming the interference image from said polarized interference light beam.

19. A method according to claim 18, wherein in said step b), said movement direction is along a line parallel to said ray-separating plane.

20. A method according to claim 18, wherein said step b) includes inclining said birefringent optical member at an angle with respect to the optical axis.

21. A method according to claim 19, wherein said step b) includes inclining said birefringent optical member at an angle with respect to the optical axis.

22. A method according to claim 18, wherein said step d) is accomplished by passing said two light rays through a second lens and a second birefringent optical element.

23. A method according to claim 21, wherein said step d) is accomplished by passing said two light rays through a second lens and a second birefringent optical element.

24. A method of forming an interference beam from which a high-quality color image of an object in a differential interference microscope is capable of being formed, the method comprising the steps of:

a) passing polarized light through a movable birefringent optical member having a ray-separating plane intersecting the optical axis at an intersection point, thereby creating two diverging mutually orthogonal linearly polarized light rays;

b) imparting a first phase difference between said two rays by moving said movable birefringent optical member in a movement direction such that said intersection point remains at a substantially fixed position on the optical axis;

c) passing said two light rays through a lens having a focal point arranged to substantially coincide with said intersection point, thereby making said two light rays parallel and guiding said two light rays to the object such that the object imparts a second phase difference between said light rays; and d) synthesizing said two light rays to form the interference beam.

* * * * *